United States Patent Office 3,029,887
Patented Apr. 17, 1962

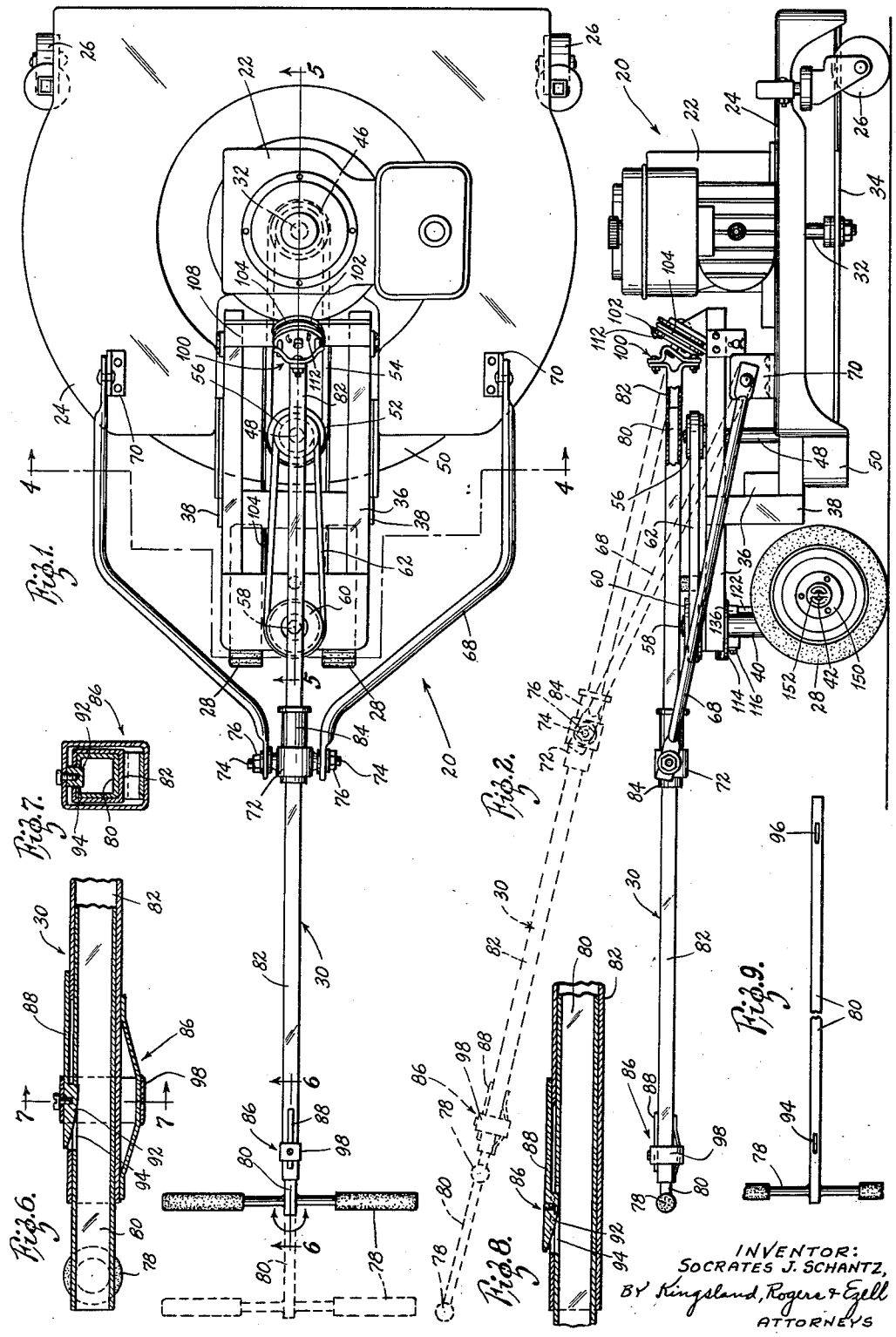

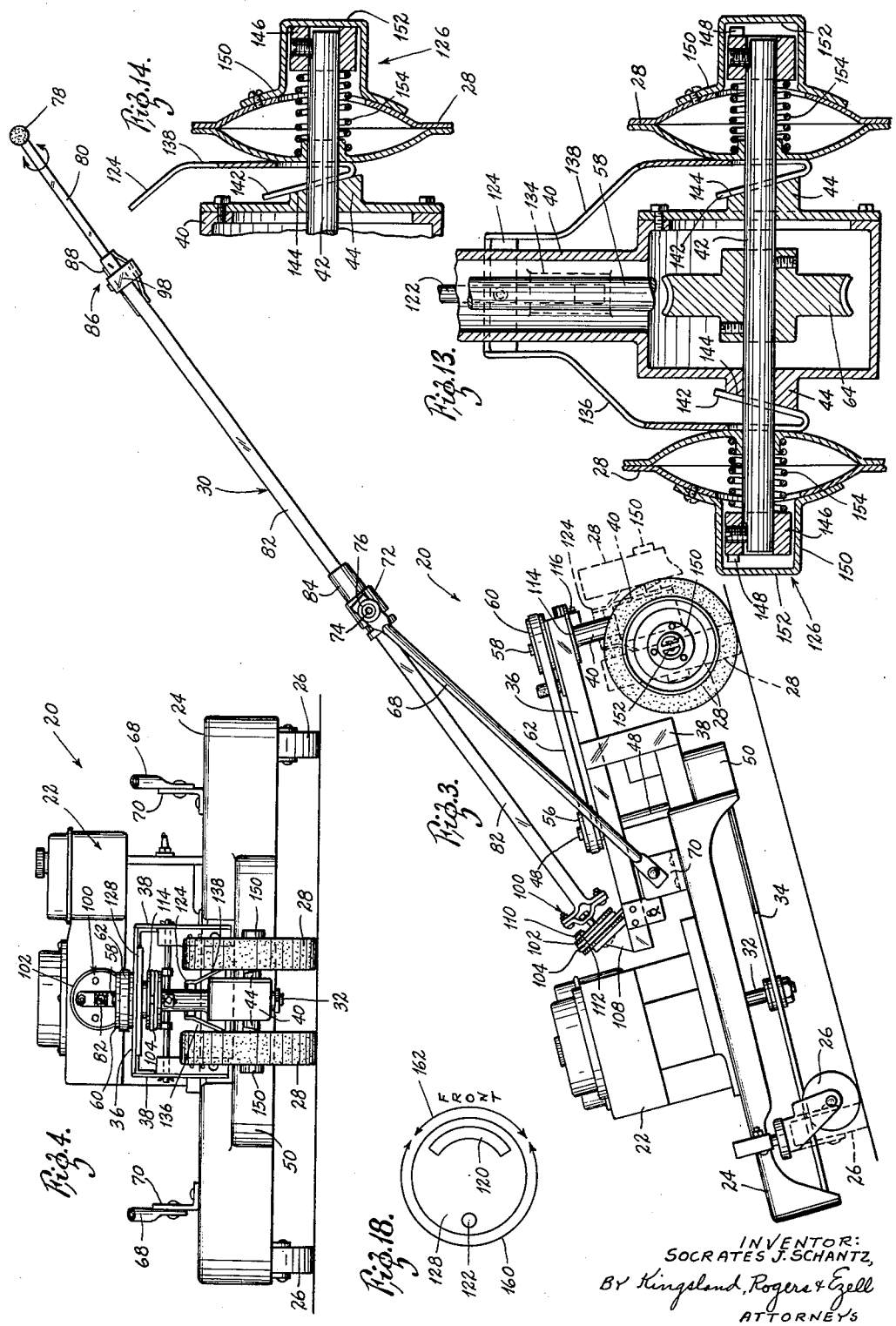

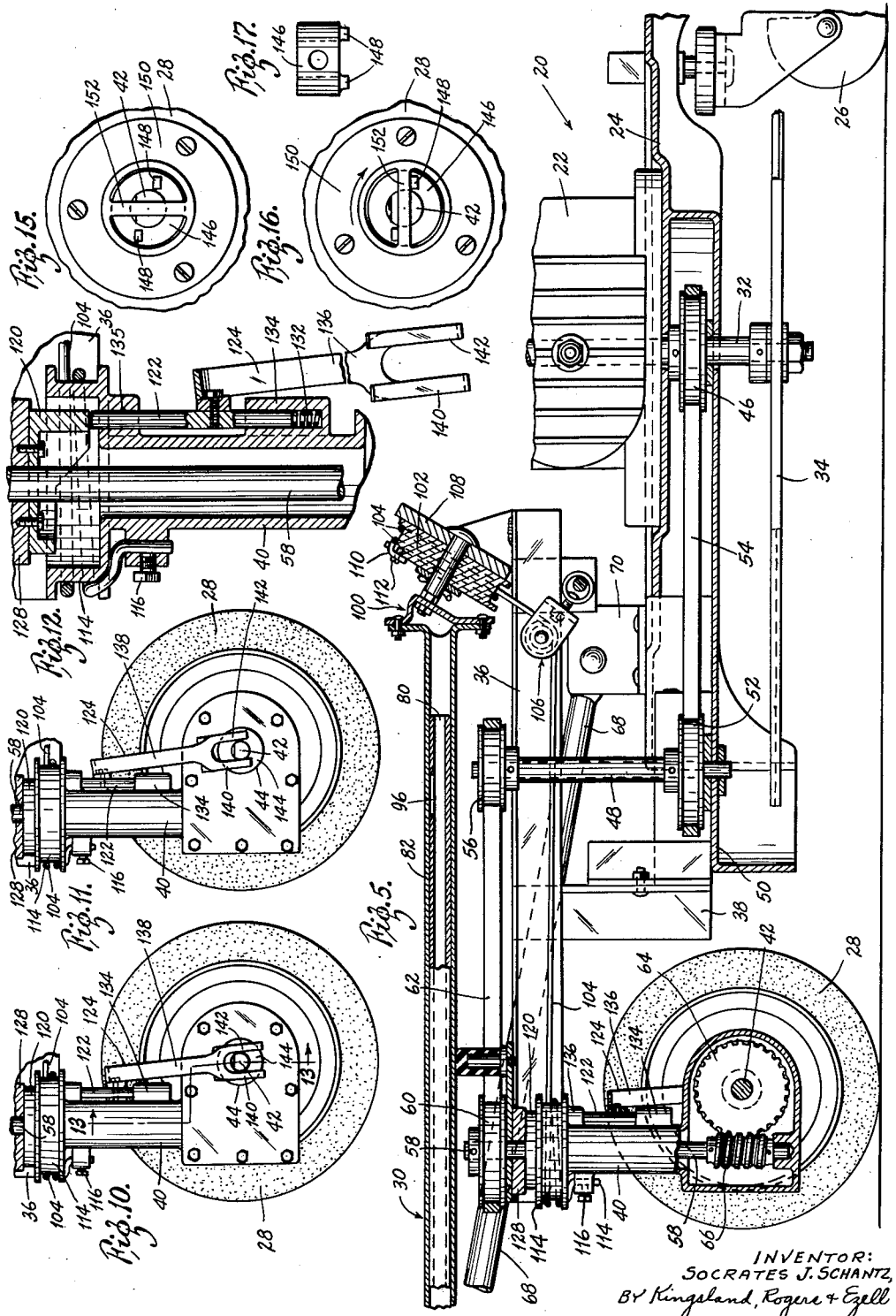

3,029,887
POWER MOWER HAVING DRIVE WHEELS CONTROLLABLE BY ROTATABLE HANDLE
Socrates J. Schantz, Box 134, Marine, Ill.
Filed Dec. 14, 1960, Ser. No. 75,703
16 Claims. (Cl. 180—19)

This invention relates to improvements in power mowers, and, in particular, is concerned with a wheel driven power mower having means for controlling the driven and steering relation of the wheels by a rotatable handle.

In the past, power mowers, and particularly those of the rotary type, have been provided which are adapted to be powered by driving the rear wheels. However, these mowers, although having various clutching means of one type or another, have had no simple mechanism providing for both steering and clutching and unclutching of the drivewheels. The mowers of the past have been particularly difficult to operate in corners or upon the sides of steep terraces.

By means of this invention there has been provided a power mower in which the rear wheels are adapted to be clutched and unclutched in driven relation, and in which steering may be effected through control of the power mower handle. The handle can be rotated about its axis to provide for both clutching and unclutching operations and also to provide for steering of the rear wheels. Through the proper manipulation of the handle the mower can be steered in both the clutched and unclutched operation. Further, through the provision of extension means on the handle, the mower can be operated along steep terraces horizontally along the sides of the terrace by an operator. The operator can provide proper operation of the handle to provide for cutting of the terrace either in arcs of increasing radius by extending the handle, or, where desired, can operate the mower in a horizontal direction by turning the wheels in the proper direction.

The mower of this invention is particularly well adapted for use with conventional rotary mowers by proper adaptation. It can also, however, be used in reel-type mowers and other types of mechanisms through the broad concepts of the invention provided by the steering and clutching mechanism made possible by this contribution. It is particularly significant that the entire control of the power mower is effected in both the steering and the clutching operation by the rotation or turning of the handle and no other complicated controls are required.

It is a further significant feature of this invention that the mower can be operated in conventional fashion where the rear wheels are kept in an aligned direction with the axis of the mower so that it is operated with the wheels in an undriven relationship in the manner of a mower having no driven wheels. Further, the mower, by proper manipulation, can be operated to cut in intricate corners adjacent shrubbery and the like through the complete control provided by the steering mechanism. This operation may be effected with the wheels in proper driven relation and complete steering and turning of the wheels is provided for by the operation of the rotatable handle.

It is, accordingly, a primary object of this invention to provide a power mower in which driven wheels may be controlled by rotation of a mower handle.

It is a further object of this invention to provide a power mower in which driven wheels can be clutched and unclutched and rotated for proper steering by rotation of a mower handle.

Still another object of this invention is to provide a power mower having an extensible handle in which the handle may be turned about its axis to provide for clutched and unclutched control of driven wheels and also to provide for steering of these wheels to manipulate the power mower.

Yet a further object of this invention is to provide a rotary power mower having power take off means transferable to a pair of rear wheels in which the rear wheels may be clutched and unclutched and turned for proper steering operation through rotation of a handle.

Still another object of this invention is to provide a simple and novel clutching means for a pair of driven wheels connected to an axle or drive shaft in which the turning of the wheels about a stationary pivot effects both the steering of the vehicle and the clutching of the vehicle.

Yet another object of this invention is to provide a rotary power mower having an extensible handle which may be turned to provide steering and clutching operation of a pair of driven wheels.

Yet another object of this invention is to provide a rotary power mower which is adapted to be driven by clutchable rear wheels in which steering can be effected through operation of a handle in which the mower is made of conventional components and is strong and rugged in construction and can be operated in a simple manner by relatively unskilled operators.

Still further objects of this invention will appear in the detailed description which follows and will be otherwise apparent to those skilled in the art.

For the purpose of illustration, there is shown in the accompanying drawings a preferred embodiment of this invention. It is to be understood that these drawings are for the purpose of example and that the invention is not limited thereto.

In the drawings:

FIGURE 1 is a top plan view of the power mower;

FIGURE 2 is a view in side elevation of the power mower showing the handle in full lines in a lowered position and in dotted lines showing the handle in a raised and extended position;

FIGURE 3 is a view in side elevation of the mower shown in a mowing position on the side of a hill;

FIGURE 4 is a rear elevational sectional view taken on the line 4—4 of FIGURE 1;

FIGURE 5 is an enlarged view in section taken on the line 5—5 of FIGURE 1 showing the construction of the power operating mechanism;

FIGURE 6 is an enlarged view in section taken on the line 6—6 of FIGURE 1 showing the construction of the telescoping handle;

FIGURE 7 is a view in section taken on the line 7—7 of FIGURE 6 showing further construction of the telescoping handle and locking means;

FIGURE 8 is a view taken similarly to FIGURE 6 with the locking band removed;

FIGURE 9 is a top plan view of the handle and shaft element;

FIGURE 10 is a fragmentary view in side elevation taken from the right side of the power mower and with the right rear wheel removed showing the clutch fork cam in the lowered position and wheels unclutched from the drive axle;

FIGURE 11 is a view taken similarly to FIGURE 10, but showing the clutch fork in the elevated position in which the wheels are clutched to the drive shaft;

FIGURE 12 is an enlarged sectional view taken on an axial section passing through the clutch mechanism and power transmitting mechanism;

FIGURE 13 is an enlarged sectional view taken on the line 13—13 of FIGURE 10 showing the clutch fork in a lowered position and the wheels unclutched;

FIGURE 14 is a fragmentary view taken similarly to FIGURE 13, but showing only the right wheel in a clutched position with the clutch fork elevated;

FIGURE 15 is an enlarged fragmentary view in side elevation showing a clutch plate mounted on the wheel and out of engagement with clutch studs mounted upon the drive shaft;

FIGURE 16 is a view taken similarly to FIGURE 15, but showing the clutch plate and its clutch bar in clutched position with the clutch studs;

FIGURE 17 is an enlarged top plan view of the clutch block having two clutch studs; and FIGURE 18 is a schematic diagram showing the relative positions of the drive wheels, the clutch operating pin and cam for clutched and unclutched operation.

The power mower of this invention is generally indicated by the reference numeral 20 in FIGURES 1, 2, 3, 4, and 5. As there shown it is comprised of a power unit, specifically an engine 22, a base 24, a pair of front caster wheels 26, a pair of drivable rear wheels 28, and an extensible and rotatable handle 30.

The engine 22 is of conventional construction and may be either a two cycle or four cycle gasoline engine, or other power unit such as an electric motor. It is provided with a crank shaft 32 to which a rotary mower blade 34 is connected at the bottom.

A horizontal supporting frame 36 is connected by a pair of vertical struts 38 to the rear of the main mower base 24 as best shown in FIGURES 2 and 5. The frame 36 serves as a supporting mechanism for the securing elements attached to the handle and also serves as a support for the rear wheels and the power take off mechanism.

A gear housing 40 is pivotally connected to the rear of the frame 36 as best shown in FIGURES 2 and 5. This housing supports a drive shaft or axle 42, which is journalled within bosses 44 protruding from the side of the housing. The drive wheels 28 are in turn journalled upon the ends of the drive shaft or axle 42.

The power take off mechanism of this invention starts with the pulley wheel 46 which is keyed to the crankshaft 32 of the engine. A counter shaft 48 is rotatably journalled in the rear of subextension 50 of the main base 24. The power transfer means comprising a pulley wheel 52 keyed to the counter shaft 48 provides for power transfer from the crankshaft and the pulley wheel 46 by a pulley belt 54. The top of the counter shaft 48 is journalled within the frame 36 and is connected to a top counter shaft pulley wheel 56. This power means in turn is transferred to a worm gear shaft 58 journalled in the gear housing 40 and connected to a top worm gear pulley wheel 60 as shown in FIGURE 5. The top worm gear pulley wheel 60 is connected to the top countershaft pulley wheel 56 by the pulley belt 62. Power from the worm gear shaft 58 is transferred to the gear wheel 64 meshing with the worm gear 66 provided at the bottom of the worm gear shaft. The gear wheel 64 is in turn keyed to the driveshaft or axle 42 to furnish power to the rear driving wheels 28.

The rotatable steering handle 30 is best shown in FIGURES 1, 2, 5, 6, 7, 8, and 9. As there shown it is comprised of a bifurcated handle frame 68, which is connected at the bottom end to brackets 70 mounted upon the base of the mower. The handle frame is further provided with a sleeve 72 which is mounted on the mower handle frame in pivotal relation by stubshafts 74 provided with locking nuts at both ends indicated by the numeral 76.

The mower handle further is composed of a handle bar element 78, which is of the cross bar type and is connected to an extensible handle shaft 80. The handle shaft 80 is of a tubular construction and nests within a further handle extension shaft 82. The handle shaft extension 82 is provided with a cylindrical bearing element 84, which nests within and fits slidably within the sleeve 72 of the bifurcated handle frame.

It will be noted that a locking means, generally designated by the reference numeral 86, provides for locking of the handle extension in one of several extended positions. The locking means comprises a locking member 88 which is spring biasedly connected to the outer handle extension element 82. The locking member has a detent locking head 92, which is adapted to be locked into locking slots 94 and 96 provided in the interior handle shaft element 80. Normally, the locking detent element 92 is biased out of engagement with the slots, but a locking ring 98 is slidable into contact with the locking member 88 to depress the locking element into the slots to secure the locking engagement.

It will be noted that for rigidity of construction, and to minimize wear, the telescoping shaft elements 80 and 82 are made up of a rectangular cross section. Thus, upon twisting of the handle, torque is eliminated from the locking element when it is in the locking position and disposed within the aforementioned slots. Where desired, the shafts may be made of a cylindrical nature, however, but it will be understood that greater strain and torque is then put upon the locking device.

The steering mechanism whereby rotation of the handle effects the steering of the rear wheels 28 further includes a flexible coupling connection 100 connected on one side to the bottom of shaft 82 and at the other to a rotatable drum 102 mounted upon the frame 36. The drum 102 is provided with a steering cable 104 which is guided by guide pulleys 106 on either side of the frame. It will be noted that the drum 102 is mounted upon an inclined support plate 108, which in turn is connected to the frame. Through this arrangement rotation of the handle shaft effects rotation of the drum and in turn moves the steering cable 104 back and forth.

The steering cable 104 has one end 110 securely connected by a locking screw 112 to the drum 102, and the other end connected to a drum 114 connected rigidly to the top of the gear housing 40. The end connected to the gear housing drum is also adapted to be adjustably locked in place by a locking screw 116. As shown in the drawings, the steering cable 104 is wound around the drums 114 and 102 at least one full revolution in order to provide the necessary friction to impart movement to these elements as will be well understood.

The clutching mechanism for engaging and disengaging the wheels from driving operation upon the rotation of the steering handle is best shown in FIGURES 5 and 10 through 17. As there shown, it includes as its main component a cam 120 which is carried in stationary relationship by the frame, a cam contacting pin 122, and connected clutch fork 124, which are rotatably supported by the gear housing, and a wheel clutching mechanism, generally indicated by the reference numeral 126.

The cam 120 is best shown in FIGURE 12 and as there shown is rigidly connected to the frame by a connecting plate 128. The cam extends over approximately 120 degrees of a circular arc and is positioned in a forwardly direction. The cam 120 fits within the open portion of the drum 114 formed at the upper part of the gear housing for protection. As shown in FIGURE 12, the cam is adapted to engage an upwardly biased contacting pin 122. The upward biasing is effected by a biasing spring 132. The contacting pin 122 is guided within a bearing portion 134 connected to the side of the gear housing and is guided at the top by a guide opening 135 positioned in the lower portion of the drum 114.

The clutch fork 124, as best shown in FIGURES 12 and 13, is rigidly connected to the contacting pin 122. It is comprised of left hand and right hand arms 136 and 138, respectively. For the purpose of illustration only, one arm will be described as it will be understood that the construction of both of these is identical except for reversal of the camming element as will be apparent from FIGURE 13. The left hand arm 136 has a bifurcated lower portion with two cam elements 140 and 142, which fit over the axle in guided relation and are adapted to contact a cam surface 144 formed upon the boss 44 connected to the side of the gear housing. The cam surface 144 and the boss 44 further serve as a bearing for the drive shaft 42 as appears in FIGURE 13. Both arms 136 and 138 are capable of flexing a slight degree and it will be understood that when they are urged downwardly by the contact of the contacting pin with the cam, the lower ends of the arms move outwardly, because of the contact of the cam elements 140 and 142 with the cam surface. This outward movement of the arms causes the wheels to move outwardly and disengage from the clutch position.

As shown in FIGURES 13 through 17, a clutch block 146 is keyed to each end of the drive shaft. This clutch block, as shown in FIGURES 13 and 17, is provided with a pair of clutch studs 148 which are engageable by a clutch bar as will appear hereinbelow. When so engaged there is driving relation established in full clutching operation.

The clutch plate or member 126 is best shown in FIGURES 13 through 16. As there shown it comprises a hub element 150, which is secured to each of the drive wheels. The hub member 150 is provided at the hub end with a clutch bar 152, which is provided by cutting out the face of the hub end. This is best shown in FIGURES 13 and 15 and 16.

The clutching operation can be readily understood by referring to FIGURE 13. As there shown a compression spring 154 is axially fitted over the driveshaft with one end bearing against the clutch block 146 and the other end bearing against the inside of the drive wheel. This bias spring therefore urges the wheel inwardly to a limiting movement defined by contact with the clutch fork 136. Since the clutch fork 136 is in the downwardly operated position, as shown in FIGURE 13, it is moved slightly outwardly and therefore the drive wheel is moved outwardly so that the clutch bar 152 does not engage the clutch studs 148 upon the clutch block. Therefore, in the position shown in FIGURE 13, both of the drive wheels are in free wheeling operation and are not clutched.

For the fully clutched operation, reference is made to FIGURE 14. In this position it will be noted that the clutch fork 138 is in the upwardly operated position. In this position, due to the camming action of the cam fingers 140 and 142 with the cam surface 144, the clutch fork is moved inwardly. This in turn permits the drive wheel to follow it because of the action of the biasing spring. As the wheel moves inwardly the clutch bar 152 is engaged between the clutch studs 148 of the clutch block in the relationship shown in FIGURE 16. This establishes the wheels in the fully driven operation so that they may be powered and driven by the rotation of the driveshaft.

*Operation*

The power mower of this invention is very simply operated by starting the engine in conventional fashion with the mower drive wheels in the neutral position. For convenient reference to the position of the drive wheels, FIGURE 18 shows the wheel directions for clutched and unclutched operation.

FIGURE 18 is a schematic top plan view of the cam 120 and the contacting pin 122. It will be recalled that the cam 120 is connected to the frame and is stationary, while the contacting pin 122 is carried by the gear housing and rotates as the wheels are turned by the rotation of the handle. In the position shown in FIGURE 18, the contacting pin 122 is in the upward or wheel clutched position since it is out of engagement with the cam. The arcuate movement of the wheels and the contacting pin, through the arc identified by the reference numeral 160, defines the clutched operation. When the contacting pin is turned to contact the cam 120 in the path indicated by the arc 162, the wheels are unclutched and in effect they are in the neutral position. It is in this neutral or unclutched position defined by the arc 162 where the contacting pin contacts the cam that the engine is first started.

With the engine started, the crankshaft 32 rotates and imparts power to the mower blade 34 in the usual fashion. With the rotation of the crankshaft 32 the pulley wheel 46 is also rotated and imparts power to the countershaft 48 by the pulley belt 54 passing over the lower pulley wheel 52. The rotation of the countershaft 48 in turn imparts rotary movement to the top pulley wheel 56 and power is transferred through the pulley belt 62 to the rear pulley wheel 60 that is geared to the shaft 58 of the worm gear 66. The worm gear 66 in turn transmits motion to the gear wheel 64 keyed to the drive shaft. Thus, it will be seen that the drive shaft 42 is continually moved. It is the operation of the clutching mechanism that connects and disconnects the drive wheels from drive relation with respect to the drive shaft 42. This operation will be described below after the operation of the steering handle mechanism.

The handle of the mower 78 may be extended very simply by moving the lock ring 96 shown in FIGURE 6 and extending the shaft 80 by moving it in the direction of the dotted line of FIGURE 1. The slot 96 is then placed in registry with the locking head or detent 92 in this extended position. When so placed in registry, the locking ring 96 is then moved to the locking position of FIGURE 6.

The handle bar 78 of the handle can be very simply rotated or twisted about the axis of the handle shafts 80 and 82. When so twisted or turned the shafts rotate with respect to the bearing sleeve 72 through virtue of the cooperating relationship of the cylindrical bearing element 84. As the shaft is turned, rotary movement is imparted through the flexible coupling 100 to the drum 102. The rotary motion of this drum will cause movement of the steering cable to turn the drum 114 mounted and rigidly secured to the top of the gear housing. This movement in turn imparts turning movement to the drive wheels. As this movement is imparted, since the wheels are supported by gear housing and since the contacting pin is also supported by the gear housing, it will be evident that the contacting pin also moves in relative rotary relation with respect to the cam 120.

When it is desired to place the wheels in clutched operation, the steering handle 78 is turned to a degree such that the contacting pin 122 moves out from under the cam 120. The drive operation is shown through the arc 160 and is approximately 240°. It will be understood, however, that the arcuate length can be changed where desired. As the contacting pin 122 is moved away from underneath the cam, it will be biased to the upward position. This in turn lifts the clutch fork 124. Then, as the clutch arms 140 and 142 are moved upwardly from the drive shaft, to the position shown in FIGURE 14, the wheels and the clutch member 150 are moved inwardly. This inward movement is effected by the biasing spring 154 and causes the engagement of the clutch bar 152 with the clutch studs 148 of the clutch block mounted upon the ends of the drive shaft. When the clutching operation above described is effected, full driving operation is accomplished from the various driving elements to the drive shaft and to the drive wheels 28.

From the above description it will be evident that the turning of the mower handle bar 78 can both steer the wheels and clutch and unclutch the drive wheels 28. Thus, full control from the neutral position to the drive position for the wheels is effected merely by turning the handle bar.

In the use of the mower it will be evident that it may be used to cut any desired path merely by proper steering through the rotation of the handle bar 78. Where desired, it may be used to cut along the profile of a terrace by a man walking along the top or side of the terrace. This is effected by turning the drive wheels to a perpendicular position with respect to the axis of the mower handle. Also, where desired, the mower may be used to cut arcs of increasing radius. This again may be effected by an operator standing at the top of the terrace and running the mower back and forth in arcs of gradually increasing radius. This increasing radius may be effected by extending the handle through the telescopic extension previously described.

The mower may also be used in conventional fashion when the wheels are in the neutral position. This is similar to a conventional mower which has rear wheels that are not driven in any fashion at all. Thus, the mower may be changed from the drive position in varying direction of steering relationship through any desired direction of the driven wheels clutched or unclutched.

Various changes and modifications may be made for the mower of this invention as will be readily apparent to those skilled in the art. Thus, as an example, where greater weight over the drive wheel for greater traction is desired, the engine may be placed directly over the gear housing to provide direct power through the worm gear and pulleys may be used through a power take off to provide power to the mower blade. Other obvious changes and modifications may also be made and will be within the scope and teaching of this invention as defined by the claims appended hereto.

What is claimed is:

1. A power mower having a power unit mounted upon a base and having separate pairs of front and rear wheels, an elongated handle and manual means for turning said handle about its longitudinal axis, means for steering the power mower by turning said rear wheels about a vertical axis and means for clutching and unclutching said rear wheels to the power unit, both said steering means and said clutching means cooperating with said handle, said means comprising, a gear housing supporting the rear wheels, and connecting means between said elongated handle and the gear housing for rotating the housing and the rear wheels as said handle is turned, said means for clutching and unclutching said rear wheels being responsive to the turning of said handle.

2. A power mower having a power unit mounted upon a base and having separate pairs of front and rear wheels, an elongated handle and manual means for turning said handle about its longitudinal axis, means for steering the power mower by turning said rear wheels about a vertical axis and means for clutching and unclutching said rear wheels to the power unit, both said steering means and said clutching means cooperating with said handle, said means comprising, a gear housing supporting the rear wheels, and connecting means between said elongated handle and the gear housing for rotating the housing and the rear wheels as said handle is turned, said means for clutching and unclutching said rear wheels being responsive to the turning of said handle, said last named means comprising a clutch member operable by the turning of said housing to clutch and unclutch the rear wheels to the power unit.

3. A power mower having a power unit mounted upon a base and having separate pairs of front and rear wheels, an elongated handle and manual means for turning said handle about its longitudinal axis, and means for clutching and unclutching said rear wheels to the power unit, said last named means comprising a clutch member supported by a housing in which the rear wheels are journalled, and said clutch member including an operating pin relatively movable with respect to a cam and connecting means between the clutch member and the elongated handle for translating the turning of said handle to the relative movement between the operating pin and the cam.

4. A power mower having a power unit mounted upon a base and having separate pairs of front and rear wheels, an elongated handle and manual means for turning said handle about its longitudinal axis, and means for clutching and unclutching said rear wheels to the power unit, said last named means comprising a clutch member supported by a housing in which the rear wheels are journalled, and said clutch member including an operating pin relatively movable with respect to a cam and connecting means between the clutch member and the elongated handle for translating the turning of said handle to the relative movement between the operating pin and the cam, said connecting means comprising a drum connected to the elongated handle and a drum cable connecting the drum with said clutch member.

5. A power mower having a power unit mounted upon a base and having separate pairs of front and rear wheels, an elongated handle and manual means for turning said handle about its longitudinal axis, means for steering the power mower by turning said rear wheels about a vertical axis and means for clutching and unclutching said rear wheels to the power unit, both said steering means and said clutching means cooperating with said handle, said means comprising, a gear housing supporting the rear wheels, and connecting means between said elongated handle and the gear housing for rotating the housing and the rear wheels as said handle is turned, said means for clutching and unclutching said rear wheels being responsive to the turning of said handle, said clutching means including a clutch member supported by said gear housing, the clutch member including an operating pin relatively movable with respect to a cam.

6. A power mower having a power unit mounted upon a base and having separate pairs of front and rear wheels, an elongated handle and manual means for turning said handle about its longitudinal axis, means for steering the power mower by turning said rear wheels about a vertical axis and means for clutching and unclutching said rear wheels to the power unit, both said steering means and said clutching means cooperating with said handle, said means comprising, a gear housing supporting the rear wheels, and connecting means between said elongated handle and the gear housing for rotating the housing and the rear wheels as said handle is turned, said means for clutching and unclutching said rear wheels being responsive to the turning of said handle, said clutching means including a clutch member supported by said gear housing, the clutch member including an operating pin relatively movable with respect to a cam and the connecting means comprising a drum connected to the elongated handle and a drum cable connecting the drum with said clutch member.

7. A power mower having a power unit mounted upon a base and having separate pairs of front and rear wheels, an elongated handle and manual means for turning said handle about its longitudinal axis, means for steering the power mower by turning said rear wheels about a vertical axis and means for clutching and unclutching said rear wheels to the power unit, both said steering means and said clutching means cooperating with said handle, said means comprising a gear housing supporting the rear wheels, and connecting means between said elongated handle and the gear housing for rotating the housing and the rear wheels as said handle is turned, said means for clutching and unclutching said rear wheels being responsive to the turning of said handle, said clutching means including a clutch member supported by said gear housing, the clutch member including an operating pin carried by said housing and being movable with respect to said housing, and a cam mounted upon a stationary frame of the power mower, said cam being engageable by the operating pin as said housing is rotated to clutch and unclutch the rear wheels.

8. A power mower having a power unit mounted upon a base and having separate pairs of front and rear wheels, an elongated handle and manual means for turning said handle about its longitudinal axis, and means for clutching and unclutching said rear wheels to the power unit, said last named means comprising a clutch member and connecting means connecting the clutch member to the elongated handle, said clutch member comprising a vertically movable clutch fork engageable with a clutch block mounted upon a drive shaft supporting said rear wheels to clutch and unclutch said wheels to the drive shaft.

9. A power mower having a power unit mounted upon a base and having separate pairs of front and rear wheels, an elongated handle and manual means for turning said handle about its longitudinal axis, and means for clutching and unclutching said rear wheels to the power unit, said last named means comprising a clutch member and connecting means connecting the clutch member to the elongated handle, said clutch member comprising a vertically movable clutch fork having a camming arm engageable with a clutch block mounted upon a drive shaft supporting said rear wheels to move them along the powered drive shaft into and out of clutching engagement.

10. A power mower having a power unit mounted upon a base and having separate pairs of front and rear wheels, an elongated handle and manual means for turning said handle about its longitudinal axis, and means for clutching and unclutching said rear wheels to the power unit, said last named means comprising a clutch member and connecting means connecting the clutch member to the elongated handle, said clutch member comprising a vertically movable clutch fork having a camming arm engageable with said rear wheels to move them along a powered drive shaft, said drive shaft being provided with a clutch block securely locked to said shaft, said wheels being engageable with said clutch block responsive to movement of the clutch fork to establish a clutching operation and being disengageable therefrom to establish the unclutched operation.

11. A power mower having a power unit mounted upon a base and having separate pairs of front and rear wheels, an elongated handle and manual means for turning said handle about its longitudinal axis, and means connected to the handle for clutching and unclutching said rear wheels to the power unit, said last named means comprising a vertically movable clutch fork having a camming arm engageable with a clutch block mounted upon a drive shaft supporting said rear wheels to move them along a powered drive shaft into and out of clutching engagement.

12. A power mower having a power unit mounted upon a base and having separate pairs of front and rear wheels, an elongated handle and manual means for turning said handle about its longitudinal axis, and means connected to the handle for clutching and unclutching said rear wheels to the power unit, said last named means comprising a vertically movable clutch fork having a camming arm engageable with said rear wheels to move them along a powered drive shaft, said drive shaft being provided with a clutch block securely locked to said shaft, said wheels being engageable with said clutch block responsive to movement of the clutch fork to establish a clutching operation and being disengageable therefrom to establish the unclutched operation.

13. A power mower having a power unit mounted upon a base and having separate pairs of front and rear wheels, an elongated handle and manual means for turning said handle about its longitudinal axis, means for steering the power mower by turning said rear wheels about a vertical axis, said last named means comprising a drum connected to the elongated handle and a drum cable connecting the drum with a housing rotatably connected to the power mower, said housing having the rear wheels journalled therein, and means for clutching and unclutching the rear wheels to the power unit responsive to the turning of said handle.

14. A power mower having a power unit mounted upon a base and having separate pairs of front and rear wheels, an elongated handle and manual means for turning said handle about its longitudinal axis, means for steering the power mower by turning said rear wheels about a vertical axis, said last named means comprising a drum connected to the elongated handle and a drum cable connecting the drum with a housing rotatably connected to the power mower, said housing having the rear wheels journalled therein, and means for clutching and unclutching the rear wheels to the power unit responsive to the turning of said handle, said last named means including an operating pin carried by said housing and movable with respect thereto, and a cam mounted upon a stationary frame of the power mower, said cam being engageable by the operating pin as said housing is rotated to clutch and unclutch the rear wheels.

15. A power mower having a power unit mounted upon a base and having separate pairs of front and rear wheels, an elongated handle and manual means for turning said handle about its longitudinal axis, means for steering the power mower by turning said rear wheels about a vertical axis, said last named means comprising a drum connected to the elongated handle and a drum cable connecting the drum with a housing rotatably connected to the power mower, said housing having the rear wheels journalled therein, and means for clutching and unclutching the rear wheels to the power unit responsive to the turning of said handle, said last named means including a cam concentric with the axis of rotation of the housing and extending less than 360°, a movable operating pin carried by said housing and being engageable by said cam and a clutch fork connected to said pin engageable with said rear wheels to clutch them and unclutch them.

16. A power mower having a power unit mounted upon a base and having separate pairs of front and rear wheels, an elongated handle and manual means for turning said handle about its longitudinal axis, means for steering the power mower by turning said rear wheels about a vertical axis, said last named means comprising a drum connected to the elongated handle and a drum cable connecting the drum with a housing rotatably connected to the power mower, said housing having the rear wheels journalled therein, and means for clutching and unclutching the rear wheels to the power unit responsive to the turning of said handle, said last named means including a cam concentric with the axis of rotation of the housing and extending less than 360°, a movable operating pin carried by said housing and being engageable by said cam and a clutch fork connected to said pin, having a camming arm engageable with said rear wheels to move them along a powered drive shaft, said drive shaft being provided with a clutch block securely locked to said shaft, said wheels being engageable with said clutch block responsive to movement of the clutch fork to establish a clutching operation and being disengageable therefrom to establish the unclutched operation.

References Cited in the file of this patent

UNITED STATES PATENTS

| | | |
|---|---|---|
| 2,292,580 | Moyer et al. | Aug. 11, 1942 |
| 2,710,069 | Johnson | June 7, 1955 |
| 2,792,718 | Ellison | May 21, 1957 |
| 2,818,699 | Clemson | Jan. 7, 1958 |
| 2,935,333 | Ekas | May 3, 1960 |